(12) United States Patent
Argentino

(10) Patent No.: US 11,149,850 B2
(45) Date of Patent: Oct. 19, 2021

(54) PISTON MADE OF CERAMIC MATERIAL

(71) Applicant: ANNOVI REVERBERI S.P.A., Modena (IT)

(72) Inventor: Pierluigi Argentino, Castelfranco Emilia (IT)

(73) Assignee: ANNOVI REVERBERI S.P.A., Modena (IT)

(*) Notice: Subject to any disclaimer, the term of this patent is extended or adjusted under 35 U.S.C. 154(b) by 0 days.

(21) Appl. No.: 17/040,212

(22) PCT Filed: Mar. 14, 2019

(86) PCT No.: PCT/IB2019/052067
§ 371 (c)(1),
(2) Date: Sep. 22, 2020

(87) PCT Pub. No.: WO2019/193437
PCT Pub. Date: Oct. 10, 2019

(65) Prior Publication Data
US 2021/0010594 A1    Jan. 14, 2021

(30) Foreign Application Priority Data
Apr. 3, 2018 (IT) .................. 102018000004176

(51) Int. Cl.
*F16J 1/12* (2006.01)
*F04B 53/12* (2006.01)
*F16J 1/00* (2006.01)

(52) U.S. Cl.
CPC .................. *F16J 1/12* (2013.01); *F04B 53/12* (2013.01); *F16J 1/00* (2013.01)

(58) Field of Classification Search
CPC ..... F16J 1/005; F16J 1/006; F16J 1/12; F04B 53/12; F04B 53/14
See application file for complete search history.

(56) References Cited

U.S. PATENT DOCUMENTS

| | | | | |
|---|---|---|---|---|
| 4,683,810 A | * | 8/1987 | Afimiwala | ................ F04B 5/00 403/267 |
| 8,100,407 B2 | * | 1/2012 | Stanton | .................. F16J 15/183 277/511 |
| 8,696,337 B2 | * | 4/2014 | Liu | ......................... F04B 1/146 417/534 |

FOREIGN PATENT DOCUMENTS

| | | |
|---|---|---|
| CN | 201225274 Y | 4/2009 |
| CN | 202149021 U | 2/2012 |
| EP | 0103906 A1 | 3/1984 |
| EP | 0108944 A1 | 5/1984 |
| GB | 2142413 A | 1/1985 |
| JP | S5576472 U | 5/1980 |

* cited by examiner

*Primary Examiner* — Thomas E Lazo
(74) *Attorney, Agent, or Firm* — Volpe Koenig

(57) ABSTRACT

A piston (1) comprising a first portion (10) suitable for coupling with an actuator member (53) and a second portion (20) made of ceramic material suitable for sliding in a cylinder (51). The first portion (10) and the second portion (20) are axially connected along a longitudinal axis (L) of the piston (1). The second portion (20) has an elongated shape along the longitudinal axis (L) of the piston (1), with an interface base (21) proximal to the first portion (10) and a free base (23) distal from the first portion (10). Moreover, the free base (23) is closed and entirely defines a piston crown.

5 Claims, 3 Drawing Sheets

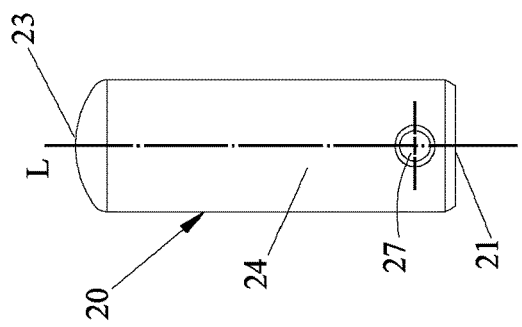
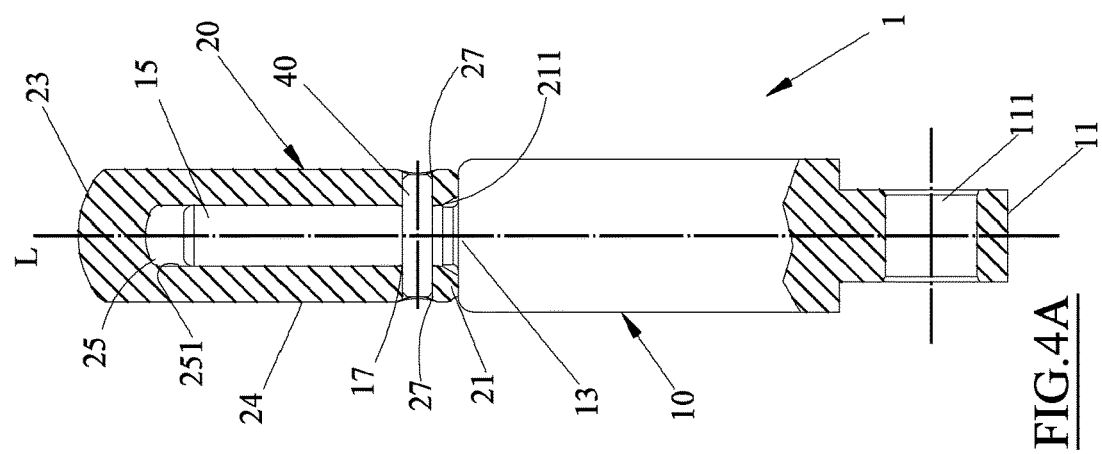
FIG.4A
FIG.4B
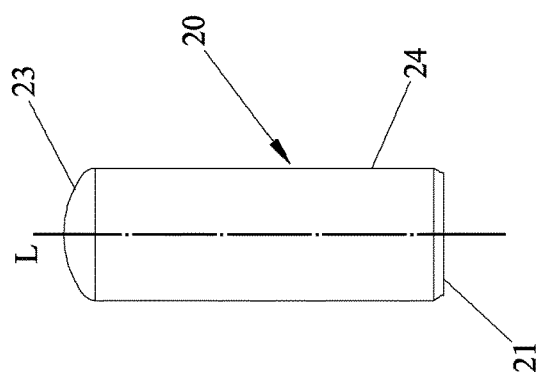
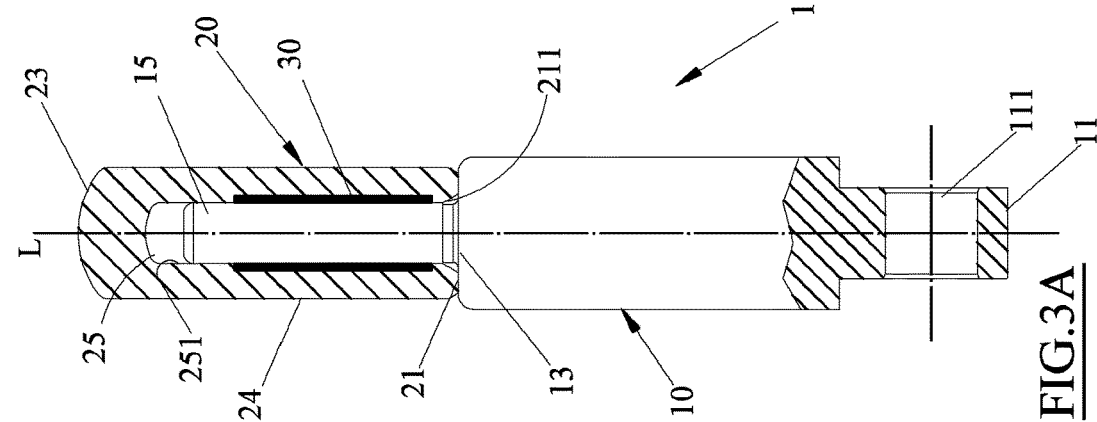
FIG.3A
FIG.3B

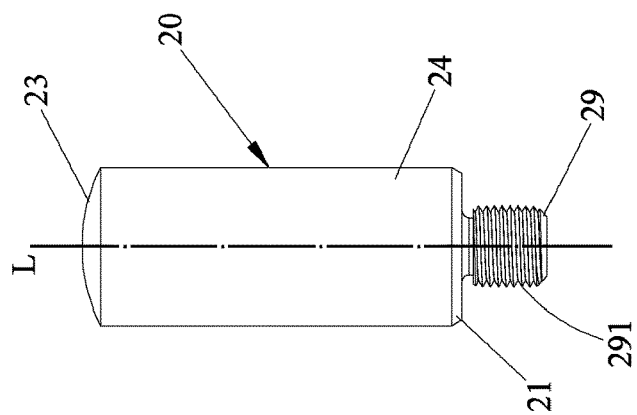
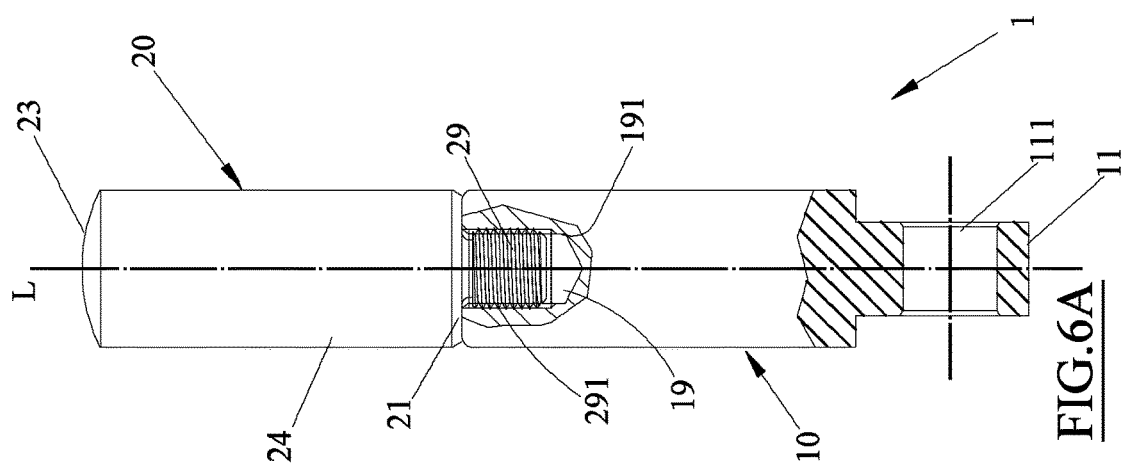
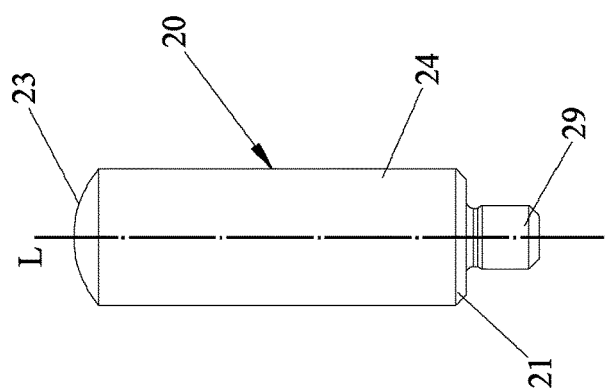
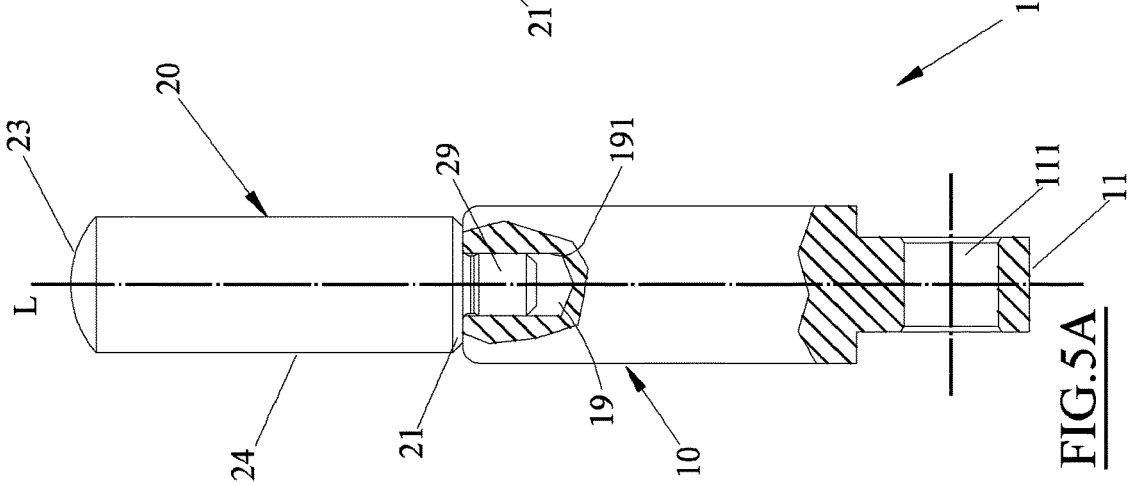

PISTON MADE OF CERAMIC MATERIAL

TECHNICAL FIELD

The present invention relates to the sector of mechanics. In detail, solutions according to embodiments of the present invention refer to a piston, in particular comprising at least one portion made of ceramic material. Moreover, the present invention relates to an operating machine comprising such piston.

EXISTING ART

As is known, pistons are a fundamental part for operating machines, for example pumps or motors.

In use, for example in volumetric piston pumps, the operating temperature and pressure of the pump, the temperature of the pumped fluid and/or the variations thereof may subject a piston—especially if it is made of metal material—to a significant mechanical stress and to thermal expansion and contraction cycles—at times with asymmetrical intensity along a longitudinal axis of the piston—which may result in a reduction of the performance of the pump and/or accelerate the wear of the piston, if it doesn't directly result in damage thereto.

Such problems have been dealt with in the art by providing pistons comprising a shell which is at least partially made of ceramic material. Indeed, ceramic materials (such as for example, alumina) are thermally refractory materials that are resistant to increased pressures, which may also be processed on surfaces provided with a highly contained friction coefficient. A typical piston with a part made of ceramic material comprises a metal material body, which is provided with an end connected to an actuator member—for example, a connecting rod-crank kinematism—for moving the piston with a reciprocating motion, and an opposite end comprising a stem. This stem in inserted in through manner inside a sleeve made of ceramic material to project from the opposite side where a fastening element, such as a nut or a pin, is coupled to a free end of the stem in order to block the ceramic sleeve in position. Retaining elements such as one or more O-rings typically are placed between stem and sleeve to prevent a transfer of fluid through a gap between stem and sleeve.

However, during the life of the piston, the stem, the fastening element and/or the retaining elements may deteriorate and/or become deformed, thus allowing leaks of the fluid through the clearance between the stem and the ceramic sleeve. This clearance in general reduces the performance of the pump and may cause stresses on the sleeve of such entity as to cause the formation of cracks, tears and at the limit, the breaking thereof.

Moreover, it may happen during the assembly of the piston that the ceramic sleeve is subjected to a compression due to excessive tightening of the fastening element—for example, due to the nut being tightened too much. Indeed, an excessive tightening may cause cracks, tears or breaks in the sleeve.

The disadvantages mentioned above may be accentuated in the case of pumped fluids having such chemical composition as to "attack" (for example, corrode and/or oxidize) the material of the stem and possibly, of the fastening element and/or of the retaining elements.

An object of the present invention is to overcome the mentioned drawbacks of the prior art, within the context of a simple and rational solution and at a contained cost.

It is a further object of the present invention to provide a piston comprising a pair of portions, of which one made of ceramic material, which are associable in a simple and effective manner.

These purposes are achieved by the features of the invention set forth in the independent claim. The dependent claims outline preferred and/or particularly advantageous aspects of the invention.

DESCRIPTION OF THE INVENTION

One embodiment of the present invention makes available a piston comprising a first portion suitable for coupling with an actuator member and a second portion made of ceramic material suitable for sliding in a cylinder. The first portion and the second portion are axially connected along a longitudinal axis of the piston. The second portion has an elongated shape along the longitudinal axis of the piston, with an interface base proximal to the first portion and a free base distal from the first portion. The free base of this second portion made of ceramic material is closed and entirely defines a piston crown.

Thanks to such solution, the piston is capable of operating in a reliable and long-lasting manner also if subjected to increased operating temperatures and pressures, and also to substantial variations thereof during operation. Moreover, the piston substantially cannot be attacked by a wide range of chemical agents and therefore it is suitable in applications in which corrosive and/or oxidizing fluids are used, also in consideration of the fact that such fluids cannot leak through the closed free base of the ceramic portion. In addition, such solution eliminates the use of fastening means capable of compressing the second portion, thus removing the risk of an impairment thereof.

In one embodiment, the second portion has a cup shape and comprises a cavity elongated along the longitudinal axis of the piston which is accessible through an opening on the interface base. In addition, the first portion comprises a stem elongated along the longitudinal axis of the piston inserted axially into the cavity of the second portion.

In this way, the two portions of the piston may be associated in a simple and immediate but at the same time stable and secure manner.

In one embodiment, a longitudinal extension of the cavity of the second portion is greater than a longitudinal extension of the stem of the first portion. Thanks to such solution, no stresses to which the free base is subjected to along the longitudinal axis of the piston are directly transmitted to the stem. Moreover, the second portion made of ceramic material may be associated with first portions having stems with different lengths, without requiring adaptations.

In one embodiment, the first portion and the second portion are mutually constrained by an adhesive element arranged in contact with a surface of the stem of the first portion and an inner surface of the second portion which delimits the cavity.

In this way, the first portion may be firmly fastened to the second portion in an effective manner. In particular, the adhesive element is to ensure the coupling between the two portions of the piston in use in a pump during the suction steps of the pump, in which a vacuum of the chamber tends to move away the two portions of the piston in axial direction.

In one embodiment of the present invention, the stem of the first portion comprises a first through hole with an axis transversal to the longitudinal axis of the piston. In addition, the second portion comprises a second through hole formed facing the cavity and coaxial to the first through hole. Advantageously, a pin is axially inserted into the first through hole and into the second through hole.

In this way, the first portion and the second portion of the piston are firmly fastened to each other, in particular with respect to a movement along the longitudinal axis of the piston. Moreover, the arrangement of the through holes and of the pin allows disengaging the first portion from the second portion, for example to perform a replacement operation.

In one embodiment, the first portion comprises a receptacle extending along the longitudinal axis of the piston. Moreover, the second portion comprises a coupling shank projecting from the interface base along the longitudinal axis of the piston axially inserted into the receptacle.

In this way, the two portions of the piston may be associated in a simple and immediate manner. In particular, the second portion of the piston provided with the coupling shank does not require rectifying processing operations of the through hole formed in the known solutions, which could cause cracks in the ceramic material and therefore reduce a quality of the first portion of the piston and/or increase the production rejects.

In one embodiment, the coupling shank and the receptacle are sized to mutually couple with mechanical interference.

Thanks to such solution, the coupling shank and the receptacle may be made in a simple and affordable manner but at the same time ensure an effective axial constraint between the two portions of the piston, in particular to resist to the stresses to which said portions are subjected in the above-described suction steps of a pump.

In one embodiment, a side surface of the coupling shank and an inner lateral surface of the first portion, delimiting the receptacle, are threaded so as to be screwed one to another.

In this way, the coupling shank and the receptacle are coupled with particular effectiveness, thus maintaining the two portions of the piston firmly coupled also against axial stresses having increased intensity.

A further aspect of the invention makes available a pump comprising a cylinder, an actuator member and the above piston. In detail, the first portion is connected to the actuator member to move the piston, and the second portion of the piston is axially slidingly inserted into the cylinder. Advantageously, the free base of the second portion delimits a pumping chamber in the cylinder.

Thanks to such solution, a reliable and long-lasting pump is obtained, which is also suitable for pumping corrosive and/or oxidizing fluids.

In one embodiment, the longitudinal extension of the second portion is greater than, or equal to, a stroke of the piston inside the cylinder.

In this way, only the second portion made of ceramic material slides in the cylinder. This ensures a substantially constant and low friction coefficient between the piston and the cylinder under any operating condition of the pump, which results in increased and uniform performance thereof. Moreover, this ensures the fluids pumped cannot ever reach any gap between the two portions of the piston.

BRIEF DESCRIPTION OF THE DRAWINGS

Further features and advantages of the invention will be more apparent after reading the following description provided by way of a non-limiting example, with the aid of the accompanying drawings.

FIGS. 3A to 6B are side views of the piston, with partial cut-out and/or cross-sectioned parts, and of a portion thereof according to different embodiments of the present invention.

IMPROVED METHOD FOR IMPLEMENTING THE INVENTION

Figure 2:
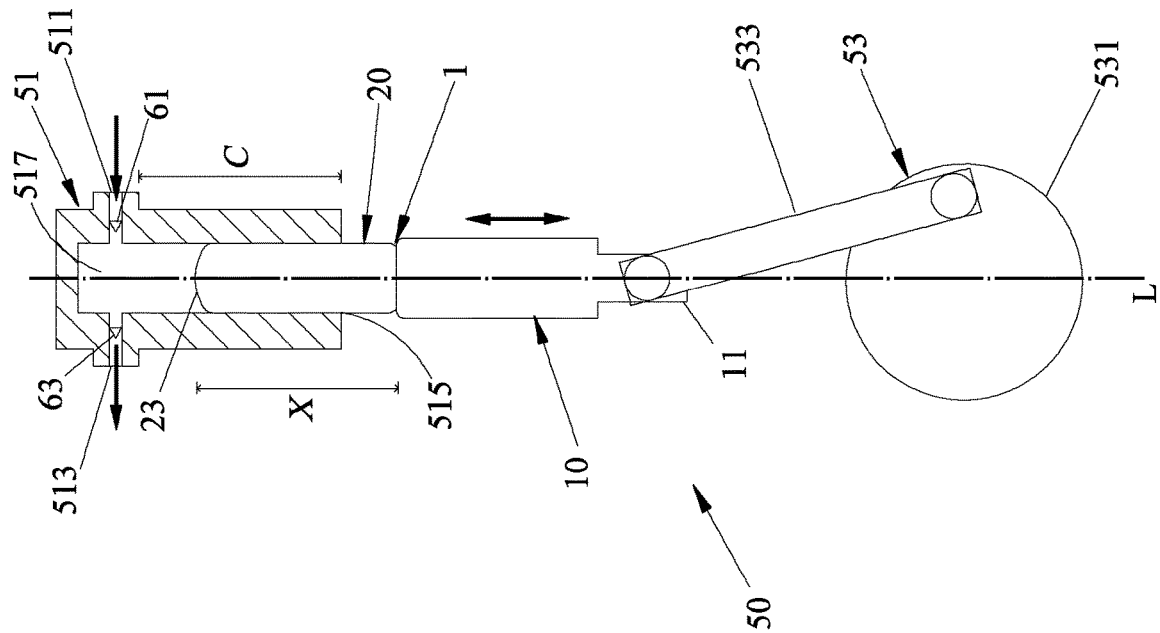
FIG. 2 is a schematic view of a pump comprising the piston of FIG. 1.
Figure 1:
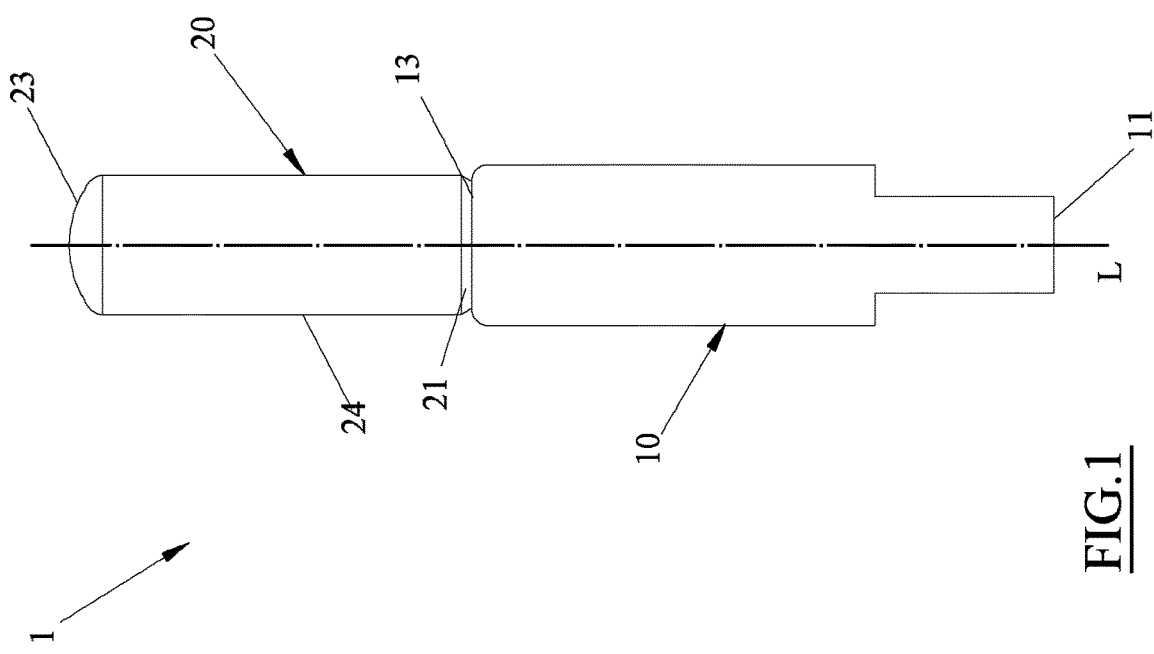
FIG. 1 is a side view of a piston according to an embodiment of the present invention.

With particular reference to such drawings, a piston is indicated as a whole with number 1.

The piston comprises a first portion 10 and a second portion 20 which are axially connected to each other along a longitudinal axis L of the piston 1.

The first portion 10 may be made of metal material, for example of steel.

The second portion 20 may be made, for example entirely made, of ceramic material or equivalently, may be made of composite material comprising a ceramic material, for example alumina.

The first portion 10 has an elongated shape along the longitudinal axis L of the piston and comprises a connecting end 11 and an opposite interface end 13. In detail, the connecting end 11 is suitable for coupling with a (rotatory or linear) actuator member which may allow moving the piston 1 with reciprocating motion along the longitudinal axis L thereof. For example, the connecting end 11 may comprise a through hole 111. The interface end 13 is suitable for coupling with the first portion 20.

The second portion 20 has an elongated shape along the longitudinal axis L of the piston 1, with an interface base 21 proximal to the first portion 10 and a free base 23 distal from the first portion 10. For example, the second portion has a cylindrical or prismatic shape, with the free base 23 and the interface base separated by a shell 24 comprising the side surface of the cylinder or the side faces of the prism. Advantageously, the shell is smoothed so as to minimize a respective friction coefficient during use.

The free base 23 is closed in the embodiments of the present invention. In this manner, the free base 23 entirely defines a piston crown 1. Advantageously, the free base 23 of the second portion 20 is a surface which substantially is transversal to the longitudinal axis L and has no openings in the direction of the longitudinal axis L, thus forming a barrier for a fluid in contact therewith. In other words, the shape of the free base 23 prevents a passage of fluid in direction of the longitudinal axis towards the interface base 21.

Preferably, although without limitation, the shell 24 and the free base 23 of the second portion 20 are formed in a single body, i.e. they are integral, as a single piece of ceramic material, for example by means of a single gluing operation.

In a first and second embodiment (shown in FIGS. 3A and 3B and in FIGS. 4A and 4B, respectively), the second portion 20 has a cup shape. Preferably, the second portion 20 comprises a cavity 25 elongated along the longitudinal axis L. Preferably, the cavity 25 has circular section. In the examples considered, the cavity 25 is accessible through an opening 211 formed on the interface base 21. Moreover, the cavity 25 is delimited by an inner surface 251 of the second portion 20.

Otherwise, the interface end 13 of the first portion 10 comprises a stem 15, which is elongated along the longitudinal axis L of the piston 1. Advantageously, the stem 15 is suitable for being axially inserted into the cavity 25 of the second portion 20. Preferably, transverse sizes of the stem 15 and transverse sizes of the cavity 25—i.e. the respective diameters in cross section in the case of cylindrical stem 15 and cavity 25—substantially are formed in corresponding manner so that stem 15 is inserted into the cavity 25 with a highly reduced clearance.

Advantageously, a longitudinal extension of the cavity 25 of the second portion 20 is greater than a longitudinal extension of the stem 15 of the first portion 10.

In the first embodiment, the first portion 10 and the second portion 20 are mutually constrained by an adhesive element 30, for example an adhesive paste. The adhesive element 30 is arranged in contact with an (outer) surface of the stem 15 of the first portion 10 and of the inner surface 251 of the second portion 20 that delimits the cavity 25. In this manner, it is possible to firmly fasten the first portion 10 and the second portion 20.

Preferably, the surface of the stem 15 and the inner surface 251 of the second portion 20 are formed with respective predetermined roughness values—for example, much greater than a roughness of the shell 24—such as to ensure a reliable adhesion of the adhesive element thereto.

In the second embodiment (shown in FIGS. 4A and 4B), the stem 15 of the first portion 10 comprises a first through hole 17. Preferably, the first through hole 17 is formed with an axis transversal to the longitudinal axis L. In addition, the second portion 20 comprises at least one second through hole formed facing the cavity 25 and aligned to a respective axis transversal to the longitudinal axis L. In the example considered, the second portion 20 comprises two axially-formed through holes 27.

Advantageously, the first through hole 17 and the second through holes 27 are arranged coaxial when the stem 15 is inserted into the cavity 25. In addition, the piston 10 comprises a pin 40, which is suitable for being axially inserted into the first through hole 17 and into the second through holes 27 so as to axially block the first and the second portion, 10 and 20, of the piston 1.

In a third and in a fourth embodiment (shown in FIGS. 5A and 5B and in FIGS. 6A and 6B, respectively), the first portion 10 comprises a receptacle 19, which extends along the longitudinal axis L (inside the first portion 10). Otherwise, the second portion 20 comprises a coupling shank 29, which projects from the interface base 21 along the longitudinal axis L. The coupling shank 29 may be formed in a single body with the rest of the second portion 20. Alternatively, the coupling shank 29 may be made independently—for example, of a different material, such as steel or aluminum—and therefore coupled to the interface base 23 of the second portion 20.

Advantageously, the coupling shank 29 is suitable for being axially inserted into the receptacle 19.

Preferably, the transverse sizes of the receptacle 19 and the transverse sizes of the coupling shank 29—i.e. the respective diameters in cross section in the case of cylindrical receptacle 19 and coupling shank 29—are formed substantially corresponding.

In the third embodiment in particular, the coupling shank 29 and the receptacle 19 are sized to mutually couple with mechanical interference. In this manner, a stable coupling is obtained between the first portion 10 and the second portion 20 of the piston 1.

Otherwise, in the fourth embodiment, an outer side surface 291 of the coupling shank 29 and an inner lateral surface 191 of the first portion 20 delimiting the receptacle 19 are threaded such that they become screwed one to another.

The piston 1 according to the embodiments disclosed above is suitable for use in an operating machine, such as a (volumetric) pump 50 shown in the schematic example of FIG. 2.

In the case considered, the pump 50 comprises a cylinder 51, an actuator member 53 and the piston 1.

The second portion 20 of the piston 1 is coaxially inserted into the cylinder 51, for example through a corresponding opening 515, in such a manner that the free base 23 delimits a pumping chamber 517 inside the cylinder 51.

In detail, the pumping chamber 517 is delimited by the free base 23 and by the inner surface of the cylinder 51. Advantageously, the free base 23 defines a movable wall of the pumping chamber 517, made uniformly and only of ceramic material.

The cylinder 51 comprises a suction mouth 511, a delivery mouth 513, which are in communication with the pumping chamber 517 of the cylinder 51. The suction mouth 511 comprises a first valve 61 configured to allow only a flow of fluid with direction entering the pumping chamber 517. Similarly, the delivery mouth 513 comprises a second valve 63 configured to allow only a flow of fluid with direction leaving the pumping chamber 517.

The first portion 10 of the piston 1 projects outside the cylinder 51 and is connected to the actuator member 53, which is configured to move the piston 1 so it slides along the longitudinal axis L coinciding with the axis in the cylinder. In the example considered, the actuator member 53 may comprise a crank 531 and a connecting rod 533, in which the connecting rod 533 has a first end hinged to the crank 531 and a second end (opposite to the first end) hinged to the connecting end 11 of the first portion 10 of the piston 1. For example, the second end of the connecting rod 533 may be hinged to the first portion 10 of the piston 1 by means of a pin inserted into the through hole 111 of the connecting end 11.

In the preferred embodiment, the longitudinal extension X of the second portion 20 of the piston 1 is greater than, or equal to, a stroke C of the piston inside the cylinder 51.

In use, the activation of the actuator member 53 causes a reciprocating axial movement of the piston 1 inside the cylinder 51, which alternately causes suction steps and expelling steps of a fluid into/from the cylinder 51. In detail, a distancing movement of the second portion 20 of the piston 1 from a closed end of the cylinder 51 causes a vacuum in the pumping chamber 517, the opening of the first valve 61 and a suction of the fluid from a first portion of hydraulic circuit (not shown) connected to the suction mouth 511. Otherwise, an approaching movement of the second portion 20 of the piston 1 from the closed end of the cylinder 51 causes an increase of pressure in the pumping chamber 517, the opening of the second valve 63 and the expulsion of the fluid into a second portion of hydraulic circuit (not shown) connected to the delivery mouth 513.

The invention thus conceived is susceptible to several modifications and variations, all falling within the scope of the inventive concept. For example, although the free base is illustrated with a curved shape, nothing prevents the same from being shaped with a different profile, such as a flat, frustoconical, inclined, concave, etc. profile, so as to obtain a piston having a crown corresponding to contingent needs.

Moreover, all the details can be replaced by other technically equivalent elements.

In practice, any materials and also any contingent shapes and sizes may be used, depending on the needs, without departing from the scope of protection of the following claims.

The invention claimed is:

1. Piston (1) comprising a first portion (10) couplable with an actuator member (53) and a second portion (20) made of ceramic material slidable in a cylinder (51), the first portion (10) and the second portion (20) being axially connected along a longitudinal axis (L) of the piston (1), wherein the second portion (20) has an elongated shape along the longitudinal axis (L) of the piston (1) with a proximal interface base (21) to the first portion (10) and a free base (23) distal from the first portion (10), the free base (23) being closed and overall defines a piston crown, wherein the second portion (20) has a cup shape and comprises a cavity (25) elongated along the longitudinal axis (L) of the piston (10) accessible through an opening (211) on the interface base (21), and wherein the first portion (10) comprises a stem (15) elongated along the longitudinal axis (L) of the piston (10) inserted axially into the cavity (25) of the second portion (20), the stem (15) of the first portion (10) comprising a first through hole (17) with an axis transversal to the longitudinal axis (L) of the piston (1), and wherein the second portion (20) comprises a second through hole (27) formed facing the cavity (25) and coaxial with the first through hole (17), and wherein a pin (40) is inserted axially into the first through hole (17) and in the second through hole (27).

2. The piston (1) according to claim 1, wherein a longitudinal extension of the cavity (25) of the second portion (20) is greater than a longitudinal extension of the stem (15) of the first portion (10).

3. The piston (1) according to claim 1, wherein the first portion (10) and the second portion (20) are mutually constrained by an adhesive element (30) arranged in contact with a surface of the stem (15) of the first portion (10) and an inner surface (251) of the second portion (20) which delimits the cavity (25).

4. Pump (50) comprising:
a cylinder (51),
an actuator member (53), and
the piston (1) according to claim 1, wherein the first portion (10) is connected to the actuator member (53) in order to move the piston (1), and wherein the second portion (20) of the piston (1) is slidingly inserted axially into the cylinder (51), with the free base (23) of the second portion (20) which delimits a pumping chamber (517) within the cylinder (51).

5. The pump (50) according to claim 4, wherein a longitudinal extension of the second portion (20) is greater than, or equal to, a stroke of the piston (1) inside the cylinder (51).

* * * * *